United States Patent
Kim et al.

(10) Patent No.: US 9,362,567 B2
(45) Date of Patent: Jun. 7, 2016

(54) ELECTRODE FOR FUEL CELL, METHOD OF PREPARING SAME, MEMBRANE-ELECTRODE ASSEMBLY AND FUEL CELL SYSTEM INCLUDING SAME

(75) Inventors: Jun-Young Kim, Yongin-si (KR); Myoung-Ki Min, Yongin-si (KR); Kah-Young Song, Yongin-si (KR); Hee-Tak Kim, Yongin-si (KR)

(73) Assignee: SAMSUNG SDI CO., LTD., Yongin-Si, Gyeonggi-Do (KR)

( * ) Notice: Subject to any disclaimer, the term of this patent is extended or adjusted under 35 U.S.C. 154(b) by 452 days.

(21) Appl. No.: 13/566,330

(22) Filed: Aug. 3, 2012

(65) Prior Publication Data

US 2013/0280636 A1 Oct. 24, 2013

(30) Foreign Application Priority Data

Apr. 20, 2012 (KR) .................. 10-2012-0041552

(51) Int. Cl.
| | |
|---|---|
| *H01M 4/86* | (2006.01) |
| *B82Y 30/00* | (2011.01) |
| *H01M 4/88* | (2006.01) |
| *H01M 8/10* | (2016.01) |

(52) U.S. Cl.
CPC ............ *H01M 4/8605* (2013.01); *B82Y 30/00* (2013.01); *H01M 4/8657* (2013.01); *H01M 4/8803* (2013.01); *H01M 4/8817* (2013.01); *H01M 2008/1095* (2013.01); *Y02E 60/50* (2013.01)

(58) Field of Classification Search
CPC ..................... H01M 4/80–4/98; H01M 8/10
USPC ........... 429/400–535; 427/155; 977/742, 734, 977/762, 773
See application file for complete search history.

(56) References Cited

U.S. PATENT DOCUMENTS

| | | | | |
|---|---|---|---|---|
| 7,220,693 | B1 * | 5/2007 | Qi et al. ...................... | 502/101 |
| 2003/0190518 | A1 * | 10/2003 | Karuppaiah et al. ............ | 429/44 |
| 2005/0142397 | A1 * | 6/2005 | Wakahoi et al. ............... | 429/12 |
| 2006/0019146 | A1 * | 1/2006 | Yoshitake et al. .............. | 429/44 |
| 2006/0045985 | A1 | 3/2006 | Kozak | |
| 2009/0148751 | A1 * | 6/2009 | Choi et al. ..................... | 429/40 |
| 2010/0015473 | A1 | 1/2010 | Hendriksen et al. | |
| 2010/0021787 | A1 * | 1/2010 | Wu et al. ...................... | 429/30 |
| 2010/0221633 | A1 * | 9/2010 | Fujita et al. ................... | 429/452 |
| 2010/0291473 | A1 * | 11/2010 | Ji et al. ......................... | 429/532 |

FOREIGN PATENT DOCUMENTS

| | | | |
|---|---|---|---|
| KR | 10-2000-0000571 A | 1/2000 | |
| KR | 10-2004-0042195 A | 5/2004 | |
| KR | 10-2007-0048246 A | 5/2007 | |
| KR | 10-2008-0109084 A | 12/2008 | |

* cited by examiner

*Primary Examiner* — James Lee
(74) *Attorney, Agent, or Firm* — Knobbe, Martens, Olson & Bear LLP (57) ABSTRACT

Disclosed are an electrode for a fuel cell, a method of preparing the fuel cell electrode, a membrane-electrode assembly including the fuel cell electrode, and a fuel cell system including the fuel cell electrode. The electrode includes an electrode substrate having a conductive substrate and a layer-by-layer assembled multi-layer disposed on a side of the conductive substrate and a bilayer including a polymer electrolyte or a conductive nanoparticle, and a catalyst layer disposed on the electrode substrate.

12 Claims, 5 Drawing Sheets

ELECTRODE FOR FUEL CELL, METHOD OF PREPARING SAME, MEMBRANE-ELECTRODE ASSEMBLY AND FUEL CELL SYSTEM INCLUDING SAME

CROSS-REFERENCE TO RELATED APPLICATIONS

This application claims priority to and the benefit of Korean Patent Application No. 10-2012-0041552 filed in the Korean Intellectual Property Office on Apr. 20, 2012, the entire contents of which are incorporated herein by reference.

BACKGROUND

1. Field of the Disclosure

This disclosure relates to an electrode for a fuel cell, a method of forming the fuel cell electrode, a membrane-electrode assembly including the electrode, and a fuel cell system including the electrode.

2. Description of the Related Technology

A fuel cell is a power generation system for producing electrical energy through an electrochemical oxidation-reduction reaction between an oxidant and a fuel such as hydrogen or a hydrocarbon-based material such as methanol, ethanol, natural gas, and the like. The fuel cell is a clean energy source with potential to replace use of fossil fuels. The fuel cell includes a stack composed of unit cells, which together produce various ranges of power output. The fuel cell may have between four and ten times higher energy density than a small lithium battery, and thus, may be used as a small portable power source.

Representative exemplary fuel cells include a direct oxidation fuel cell ("DOFC") and a polymer electrolyte membrane fuel cell ("PEMFC"). The direct oxidation fuel cell may be a direct methanol fuel cell, which uses methanol as a fuel. The PEMFC has an advantage of high energy density and high power, but also, a drawback of requiring careful handling of hydrogen gas and requiring accessory facilities such as a fuel-reforming processor for reforming methane or methanol, natural gas, and the like, to produce hydrogen gas as a fuel. The DOFC, however, has lower energy density than the PEMFC, but has an advantages that include more easily handling a liquid-type fuel, being operated at a low temperature, and needing no additional fuel reforming processor.

In the aforementioned fuel cell systems, a stack capable of generating electricity includes several to scores of unit cells stacked adjacent to one another. Each unit cell is composed of a membrane-electrode assembly ("MEA") and a separator (also referred to as a bipolar plate). The MEA is composed of an anode (also referred to as a "fuel electrode" or an "oxidation electrode") and a cathode (also referred to as an "air electrode" or a "reduction electrode") separated by a polymer electrolyte membrane.

During operation of the fuel cell systems electricity is generated as follows: A fuel is supplied to the anode and adsorbed on catalysts of the anode and then, oxidized to produce protons and electrons. The electrons are transferred into the cathode via an external circuit, while the protons are transferred into the cathode through the polymer electrolyte membrane. At the same time, an oxidant is supplied to the cathode, which oxidant reacts with the protons and the electrons on the catalysts of the cathode to produce electricity and water.

SUMMARY OF CERTAIN INVENTIVE ASPECTS

In one aspect, an electrode for a fuel cell is provided. The fuel cell electrode is capable of improving output characteristics of a fuel cell system and smoothly controlling water supply.

In another aspect, a method of preparing a fuel cell electrode is provided.

In another aspect, a membrane-electrode assembly for a fuel cell including a fuel cell electrode is provided.

In another aspect, a fuel cell system including a membrane-electrode assembly is provided.

In another aspect, an electrode for a fuel cell includes an electrode substrate including a conductive substrate and a layer-by-layer assembled multi-layer disposed on one side of the conductive substrate and a bilayer including a polymer electrolyte or a conductive nanoparticle, and a catalyst layer disposed on the electrode substrate is provided. In some embodiments, the polymer electrolyte may be poly(ethyleneimine), poly(acrylic acid), poly(diallyldimethylammonium chloride, chitosan, poly(allylamine hydrochloride), poly(vinylsulfonic acid), poly(sodium styrenesulfonate), carboxymethly cellulose, poly(ethylene glycol), or a combination thereof. In some embodiments, the polymer electrolyte may have a weight average molecular weight ranging from about 7,000 Daltons to about 1,000,000 Daltons. In some embodiments, the conductive nanoparticle may include, for example, carbon black, graphene, carbon nanotube, carbon nanofiber, inorganic nanoparticles of $SiO_2$, $TiO_2$, $ZrO_2$, or $CeO_2$, or a combination thereof. In some embodiments, the conductive nanoparticles may have a carboxyl group (—COOH), an amine group (—$NH_2$), a hydroxyl group (—OH), a sulfonic acid group (—$SO_3H$), or a nitrile group (—CN) on the surface. In some embodiments, the layer-by-layer-assembled multi-layer may have a thickness of about 50 nm to about 2 μm. In some embodiments, the layer-by-layer assembled multi-layer may have about 1 to about 40 bilayers. In some embodiments, the layer-by-layer assembled multi-layer may have about 8 to about 40 bilayers. In some embodiments, the conductive substrate may be formed of a carbon paper, a carbon cloth, a carbon felt, or a metal cloth.

In another aspect, a method of forming an electrode for a fuel cell includes, for example, dipping a conductive substrate in a first charged liquid including a first conducting material and having a first charge to form a first charged layer on the conductive substrate, dipping the conductive substrate including the first charged layer thereon in a second charged liquid including a second conducting material and having a second charge opposed to the first charge to form a second charged layer on the first charged layer, and forming a catalyst layer on the second charged layer.

In some embodiments, when the first charge has a positive charge, the second charge may have a negative charge. In some embodiments, the first conducting material having a positive charge may be formed of a polymer electrolyte of poly(ethyleneimine), poly(diallyldimethylammonium chloride, poly(allylamine hydrochloride), or chitosan, or a conductive nanoparticle. In some embodiments, the conductive nanoparticle may be formed of an amino group-containing carbon-based material; amino-functionalized $SiO_2$; $TiO_2$; $ZrO_2$; or $CeO_2$. In some embodiments, the carbon-based material may be carbon black, graphene, carbon nanotube, carbon nanofiber, or a combination thereof. In some embodiments, the $TiO_2$, $ZrO_2$, or $CeO_2$ may be prepared to have a positive charge by adjusting pH during the preparation process. For example, when $TiO_2$ is prepared under pH of about 1 to about 5, the $TiO_2$ may have a positive charge.

In some embodiments, the second conducting material may be formed of a polymer electrolyte of poly(acrylic acid), poly(vinylsulfonic acid), poly(sodium styrenesulfonate), or carboxylmethyl cellulose, or a conductive nanoparticle. In some embodiments, the conductive nanoparticle may be formed of a carbon-based material such as carbon black, graphene, carbon nanotube, a carbon nanofiber, and the like; or $SiO_2$, $TiO_2$, $ZrO_2$, $CeO_2$, and the like. In some embodiments, the conductive nanoparticle may be bonded to one or more of a carboxyl group, a hydroxyl group, or a sulfonic acid group and thus, may be more negatively charged and also, hydrophilic to form a more uniform layer-by-layer assembled multi-layer. In some embodiments, the when the conductive nanoparticle is hydrophilic, performance of a fuel cell may be improved under a low humidity condition. In some embodiments, the $TiO_2$, $ZrO_2$, or $CeO_2$ may be prepared to have a negative charge by adjusting pH during the preparation process. For example, when $TiO_2$ is prepared under pH of greater than or equal to about 8, the $TiO_2$ have a negative charge.

In some embodiments, the when the first charge is a negative charge, the second charge is a positive charge. In some embodiments, the first conducting material may be a polymer electrolyte of poly(acrylic acid), poly(vinylsulfonic acid), poly(sodium styrenesulfonate), or carboxylmethyl cellulose, or a conductive nanoparticle. In some embodiments, the conductive nanoparticle may be a carbon-based material such as carbon black, graphene, carbon nanotube, a carbon nanofiber, and the like, or $SiO_2$, $TiO_2$, $ZrO_2$, $CeO_2$, and the like. In some embodiments, the conductive nanoparticle may be bonded to one or more of a carboxyl group, a hydroxyl group, or a sulfonic acid group and then, may be more negatively charged and also, hydrophilic to form a more uniform layer-by-layer assembled multi-layer. In some embodiments, the when the conductive nanoparticle is hydrophilic, performance of a fuel cell may be improved under low humidity conditions. In some embodiments, the $TiO_2$, $ZrO_2$, or $CeO_2$ may be prepared to have a negative charge by adjusting pH during the preparation process. For example, when $TiO_2$ is prepared under pH of greater than or equal to about 8, the $TiO_2$ may have a negative charge.

In some embodiments, the second conducting material may be a polymer electrolyte of poly(ethyleneimine), poly(diallyldimethylammonium chloride, poly(allylamine hydrochloride), or chitosan, or a conductive nanoparticle. The conductive nanoparticle may be an amino group-containing carbon-based material, amino-functionalized $SiO_2$; $TiO_2$; $ZrO_2$; or $CeO_2$. In some embodiments, the carbon-based material may be carbon black, graphene, carbon nanotube, or a carbon nanofiber. In some embodiments, the $TiO_2$, $ZrO_2$, or $CeO_2$ may be prepared to have a positive charge by adjusting pH during the preparation process. For example, when $TiO_2$ is prepared under pH of about 1 to about 5, the $TiO_2$ have a positive charge. In some embodiments, the first and second charged liquids may be prepared by adding a polymer electrolyte or a conductive nanoparticle to a solvent to prepare a conductive liquid and adjusting pH of the conductive liquid in a range of about 1.5 to about 9.5. In some embodiments, the first and the second conductive liquids may have a concentration of about 0.01 wt % to about 10 wt %. In some embodiments, after forming the second charged layer and before forming a catalyst layer, heat treatment may be further performed.

In another aspect, a membrane-electrode assembly for a fuel cell is provided. The membrane-electrode assembly includes, for example, an anode and a cathode facing each other; and a polymer electrolyte membrane interposed between the cathode and the anode. In some embodiments, at least one of the cathode and the anode is an electrode according to the present disclosure.

In another aspect, a fuel cell system is provided. The fuel cell system may include, for example, a membrane-electrode assembly of the present disclosure and a separator disposed at each side of the membrane-electrode assembly, at least one electricity-generating element, a fuel supplier, and an oxidant supplier. In some embodiments, the electricity-generating element is configured to generate electricity through oxidation of a fuel and reduction of an oxidant. In some embodiments, the fuel supplier is configured to supply the electricity generating element with a fuel. In some embodiments, the oxidant supplier is configured to supply the electricity generating element with an oxidant such as oxygen or air.

In another aspect, the electrode for a fuel cell may be configured to provide improved output density and current density for fuel cell system.

BRIEF DESCRIPTION OF THE DRAWINGS

The accompanying drawings, together with the specification, illustrate exemplary embodiments, and, together with the description, serve to explain the principles of the present disclosure.

DETAILED DESCRIPTION OF CERTAIN INVENTIVE EMBODIMENTS

In the following detailed description, only certain exemplary embodiments have been shown and described, simply by way of illustration. As those skilled in the art would realize, the described embodiments may be modified in various different ways, all without departing from the spirit or scope of the present disclosure. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements. The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

An electrode for a fuel cell is disclosed. The electrode includes, for example, an electrode substrate including a conductive substrate and a layer-by-layer assembled multi-layer disposed on one side of the conductive substrate and a bilayer including a polymer electrolyte or a conductive nanoparticle, and a catalyst layer disposed on the electrode substrate.

Figure 1:
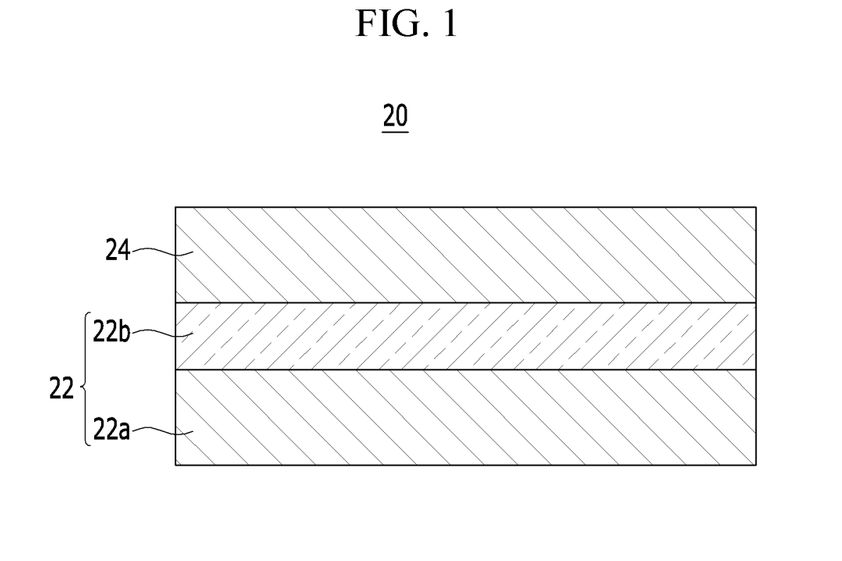
FIG. 1 is a schematic structure showing an electrode for a fuel cell according to one embodiment.

The electrode according to one embodiment is shown in FIG. 1. The electrode 20 includes the electrode substrate 22 and the catalyst layer 24. The electrode substrate 22 includes the conductive substrate 22a and the layer-by-layer assembled multi-layer 22b disposed on the one side of the conductive substrate 22a. Furthermore, the layer-by-layer assembled multi-layer 22b includes a bilayer including the polymer electrode or the conductive nanoparticle.

In general, an electrode substrate in a fuel cell is one of the main constituent elements in the fuel cell. The electrode substrate may have a comparatively big influence on fuel cell performance depending on the operating conditions. During operation of the fuel cell, the electrode substrate appropriately transfers gas and water generated during the operation of the fuel cell to allow the smooth management of water in the membrane-electrode assembly. However, since a conventional electrode substrate (for example, a conductive substrate) does not easily manage water, a fuel cell including a conductive substrate has a problem of water flooding or drying under humidifying/non-humidifying conditions during the operation, which thus, deteriorates fuel cell performance.

Accordingly, one embodiment of the present disclosure provides a conductive substrate having a layer-by-layer assembled multi-layer thereon as an electrode substrate configured to control water flooding or drying, thereby allowing the smooth management of water. The electrode substrate may include, for example, a conductive substrate and a layer-by-layer assembled multi-layer disposed on one side of the conductive substrate and including a bilayer.

The bilayer may include a polymer electrolyte or a conductive nanoparticle. The polymer electrolyte may be polyethyleneimine, polyacrylic acid, poly(diallyldimethylammonium chloride), chitosan, poly(allylamine hydrochloride), poly(vinylsulfonic acid), poly(sodium styrenesulfonate), carboxylmethyl cellulose, poly(ethylene glycol), or a combination thereof. The polymer electrolyte may have a weight average molecular weight (Mw) of about 7,000 Daltons to about 1,000,000 Daltons. When the polymer electrolyte has a weight average molecular weight within the above range, a uniform layer-by-layer assembled multi-layer may be provided. The conductive nanoparticle may be carbon black, graphene, carbon nanotube, carbon nanofiber, an inorganic nanoparticle of $SiO_2$, $TiO_2$, $ZrO_2$, or $CeO_2$, or a combination thereof. The conductive nanoparticle may have a carboxyl group (—COOH), an amine group (—$NH_2$), a hydroxyl group (—OH), a sulfonic acid group (—$SO_3H$), or a nitrile group (—CN) that is bonded on the surface.

The layer-by-layer assembled multi-layer may have a thickness of about 50 nm to about 2 μm. When the layer-by-layer assembled multi-layer has a thickness within the above range, a uniform layer-by-layer assembled multi-layer may be provided.

The conductive substrate may be formed of a carbon paper, a carbon cloth, a carbon felt, or a metal cloth (a porous film composed of a metal fiber or a metal film disposed on the surface of a cloth composed of a polymer fiber). The conductive substrate may be formed of a carbon paper, a carbon cloth, a carbon felt, or a metal cloth that is treated with a fluorine-based resin to be water-repellent. The fluorine-based resin may include polytetrafluoroethylene, polyvinylidene fluoride, polyhexafluoropropylene, polyperfluoroalkylvinylether, polyperfluorosulfonylfluoridealkoxyvinyl ether, fluorinated ethylene propylene, polychlorotrifluoroethylene, or a copolymer thereof.

The conductive substrate may further include a microporous layer. The microporous layer includes a conductive powder with a particular particle diameter, for example, a carbon powder, carbon black, acetylene black, activated carbon, a carbon fiber, fullerene, carbon nanotube, carbon nano wire, carbon nanohorn, or carbon nanoring.

The microporous layer may be formed by coating a composition including a conductive powder, a binder resin, and a solvent on the conductive substrate. The binder resin may include polytetrafluoroethylene, polyvinylidenefluoride, polyhexafluoropropylene, polyperfluoroalkylvinylether, polyperfluorosulfonylfluoride, alkoxyvinyl ether, polyvinylalcohol, cellulose acetate, or a copolymer thereof. The solvent may include alcohols such as ethanol, isopropylalcohol, n-propylalcohol, butanol, and the like, water, dimethyl acetamide, dimethylsulfoxide, N-methylpyrrolidone, tetrahydrofuran, and the like. The coating method may include, but is not limited to, screen printing, spray coating, doctor blade methods, and so on, depending on the viscosity of the composition.

The electrode substrate having the above structure may be formed through a layer-by-layer assembly method. The method may include, for example, preparing a first charged liquid including a polymer electrolyte or a conductive nanoparticle and having a first charge, dipping the conductive substrate in a first charged liquid to form a first charged layer, and dipping the conductive substrate including the first charged layer thereon in a second charged liquid having a second charge opposed to the first charge to form a second charged layer on the first charged layer. Hereinafter, the method of forming the electrode substrate is described in more detail.

First, the polymer electrolyte or conductive nanoparticle is added to a solvent to prepare a first conductive liquid. The solvent may be water, an organic solvent, or a mixture thereof. The organic solvent may be alcohols such as ethanol and the like, acetic acid, and the like. The polymer electrolyte or conductive nanoparticle is the same as described above. The first conductive liquid may have a concentration of about 0.01 wt % to about 10 wt %. When the first conductive liquid has a concentration within the range, a uniform layer-by-layer assembled multi-layer may be provided.

Subsequently, pH of the first conductive liquid is adjusted. The pH adjustment may apply a charge to the first conductive liquid. In other words, since a polymer electrolyte or a conductive nanoparticle included in the first conductive liquid has a positive charge or a negative charge, the first conductive liquid is also charged and called to be a first charged liquid. Herein, the kind of a charge appearing due to the pH adjustment may be decided by the kind of a polymer electrolyte or a conductive nanoparticle, that is, property of the polymer electrolyte or the conductive nanoparticle.

For example, when poly(acrylic acid), poly(vinylsulfonic acid), poly(sodium styrenesulfonate), or carboxylmethyl cellulose as the polymer electrolyte and a carbon-based material such as carbon nanotube, graphene, carbon black, a carbon nanofiber, and the like; $SiO_2$; $TiO_2$; $ZrO_2$; or $CeO_2$ as the conductive nanoparticle is used, a negative charge is provided. Alternatively, the conductive nanoparticle is bonded with a carboxyl group, a hydroxyl group, or a sulfonic acid group and thus, more negatively charged and hydrophilic, so that a more uniform layer-by-layer assembled multi-layer may be formed. When the conductive nanoparticle is hydrophilic, performance of a fuel cell may be improved under a low humidity condition.

The $TiO_2$, $ZrO_2$, or $CeO_2$ may be prepared to have a negative charge during the preparation process by adjusting pH. For example, when $TiO_2$ is prepared under pH of greater than or equal to about 8, the $TiO_2$ has a negative charge.

In addition, a conductive nanoparticle material inherently having a negative charge, for example, carbon nanotube is bonded with an amine group on the surface and thus, may have a positive charge. In some embodiments, when poly (ethyleneimine), poly(diallyldimethylammonium chloride), chitosan, or poly(allylamine hydrochloride) as the polymer electrolyte or amino group-containing carbon-based material, amino-functionalized $SiO_2$; $TiO_2$, $ZrO_2$, or $CeO_2$ as the conductive nanoparticle is used, a positive charge may be provided. Herein, the $TiO_2$, $ZrO_2$, or $CeO_2$ may be prepared to have a positive charge by adjusting pH during the preparation process. For example, when $TiO_2$ is prepared under pH of about 1 to about 5, the $TiO_2$ have a positive charge.

The pH may be adjusted to have pH in the range of about 1.5 to about 9.5 using HCl, $HNO_3$, or NaOH having a concentration of about 0.1M to about 1M. When a conductive substrate is dipped in the first charged liquid, a polymer electrolyte or a conductive nanoparticle therein is deposited on the surface of the conductive substrate and forms a first charged layer thereon.

Next, when the conductive substrate including the first charged layer thereon is dipped in a second charged liquid having a second charge, a second charged layer is formed on the first charged layer. The second charged liquid may be prepared by adding a polymer electrolyte or a conductive nanoparticle to a solvent like the first charged liquid and then, adjusting pH.

Here, the second charged liquid may have an opposite charge to the first charged liquid. In other words, when the first charged liquid has a positive charge, the second charged liquid may have a negative charge, while the first charged liquid has a negative charge, the second charged liquid may have a positive charge. As aforementioned, the kind of a charge may be decided by changing the kind of a polymer electrolyte or the conductive nanoparticle.

The pH may be adjusted to have pH in the range of about 1.5 to about 9.5 by using HCl, $HNO_3$, or NaOH having a concentration ranging from about 0.1M to about 1M.

In addition, the solvent may be water. The second conductive liquid may have a concentration ranging from about 0.01 wt % to about 10 wt %. When the second conductive liquid has a concentration within the range, a layer-by-layer assembled multi-layer may be uniformly formed.

The first and second charged layers are called to be a bilayer, which forms a layer-by-layer assembled multi-layer being capable of appropriately regulating water. According to one embodiment of the present disclosure, the process of forming the first and second charged layers is repeated about 1 to about 40 times, and thus, forms a layer-by-layer assembled multi-layer including about 1 to about 40 bilayers. In addition, the layer-by-layer assembled multi-layer may include about 4 to about 40 bilayers.

Then, the second charged layer may be further heat-treated. The heat treatment may be performed at a temperature ranging from about 200° C. to about 600° C. for about 0.5 to about 4 hours.

An electrode according to one embodiment includes a catalyst layer disposed on one side of the electrode substrate. The catalyst layer includes a catalyst. The catalyst may be any suitable catalyst configured for participating in a fuel cell reaction. Examples of the catalyst include a platinum-based catalyst. The platinum-based catalyst may be at least one selected from platinum, ruthenium, osmium, a platinum-ruthenium alloy, a platinum-osmium alloy, a platinum-palladium alloy, or a platinum-M alloy (M is at least one transition element selected from the group including Ga, Ti, V, Cr, Mn, Fe, Co, Ni, Cu, Zn, Sn, Mo, W, Rh, and Ru). An anode or a cathode may include the same material. However, a direct oxidation fuel cell may include a platinum-ruthenium alloy catalyst as an anode catalyst in order to prevent catalyst poisoning due to CO generated during the anode reaction. Specific examples of the catalysts include at least one selected from the group including Pt, Pt/Ru, Pt/W, Pt/Ni, Pt/Sn, Pt/Mo, Pt/Pd, Pt/Fe, Pt/Cr, Pt/Co, Pt/Ru/W, Pt/Ru/Mo, Pt/Ru/V, Pt/Fe/Co, Pt/Ru/Rh/Ni, and Pt/Ru/Sn/W.

Such a catalyst may be a metal itself (a black catalyst) or supported on a carrier. The carrier may include carbon such as graphite, denka black, ketjen black, acetylene black, carbon nanotube, carbon nanofiber, carbon nanowire, carbon nanoball, activated carbon, and so on, or an inorganic particulate such as alumina, silica, zirconia, titania, and so on. The carbon is generally used in the art. A noble metal supported on a carrier as a catalyst may be a commercially available one or prepared by supporting a noble metal on a carrier. The method of supporting a noble metal on a carrier is well-known in this field, and therefore, a detailed description thereof is omitted.

The catalyst layer may further include a binder resin to improve its adherence and proton transfer properties. The binder resin may be proton conductive polymer resins having a cation exchange group selected from the group including a sulfonic acid group, a carboxylic acid group, a phosphoric acid group, a phosphonic acid group, and derivatives thereof at its side chain. Examples of the polymer include at least one proton conductive polymer selected from the group including a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer. In one embodiment, the proton conductive polymer is at least one selected from the group including poly(perfluorosulfonic acid), poly (perfluorocarboxylic acid), a sulfonic acid-containing copolymer of tetrafluoroethylene and fluorovinylether, polyetherketone sulfide, an aryl ketone, poly(2,2'-m-phenylene)-5,5'-bibenzimidazole, or poly(2,5-benzimidazole).

The hydrogen ($H^+$) in the cation exchange group of the proton conductive polymer may be substituted with $Na^+$, $K^+$, $Li^+$, $Cs^+$, or tetrabutylammonium$^+$. When the $H^+$ is the cation exchange group of the terminal end of the proton conductive polymer side chain is substituted with $Na^+$ or tetrabutylammonium, NaOH or tetrabutylammonium hydroxide may be used during preparation of the catalyst composition, respectively. When the $H^+$ is substituted with $K^+$, $Li^+$, or $Cs^+$, a suitable compound for the substitution may be used. Since such a substitution is known in this art, a detailed description thereof is omitted.

The binder resins may be used singularly or in combination. They may be used along with non-conductive polymers to improve adherence with a polymer electrolyte membrane. The binder resins may be used in a controlled amount to adapt to their purposes. Examples of the non-conductive polymers include at least one selected from the group including poly-tetrafluoroethylene (PTFE), tetrafluoroethylene-hexafluoro-propylene copolymer (FEP), tetrafluoroethylene-perfluoro-alkylvinylether copolymer (PFA), ethylene/tetrafluoroethylene (ETFE), ethylenechlorotrifluoroethylene copolymer (ECTFE), polyvinylidenefluoride, a copolymer of polyvinylidenefluoride-hexafluoropropylene (PVdF-HFP), dodecylbenzenesulfonic acid, and sorbitol.

According to another embodiment, a membrane-electrode assembly for a fuel cell including an electrode of the present disclosure as at least one of a cathode or an anode is provided. The membrane-electrode assembly for a fuel cell includes an anode and a cathode facing each other, and a polymer electrolyte membrane interposed between the cathode and the anode.

The polymer electrolyte membrane may be any polymer electrolyte membrane made of a polymer resin having proton conductivity that is used for a polymer electrolyte membrane of a fuel cell. The proton conductive polymer resin may be a polymer resin having a cation exchange group selected from the group including a sulfonic acid group, a carboxylic acid group, a phosphoric acid group, a phosphonic acid group, and derivatives thereof, at its side chain.

Examples of the polymer resin include at least one selected from the group including a fluorine-based polymer, a benzimidazole-based polymer, a polyimide-based polymer, a polyetherimide-based polymer, a polyphenylenesulfide-based polymer, a polysulfone-based polymer, a polyethersulfone-based polymer, a polyetherketone-based polymer, a polyether-etherketone-based polymer, or a polyphenylquinoxaline-based polymer. In one embodiment, the proton conductive polymer is at least one selected from the group including poly(perfluorosulfonic acid) (commercially available as NAFION™) poly(perfluorocarboxylic acid), a sulfonic acid group-containing copolymer of tetrafluoroethylene and fluorovinylether, defluorinated polyetherketone sulfide, an aryl ketone, poly(2,2'-(m-phenylene)-5,5'-bibenzimidazole, or poly(2,5-benzimidazole).

The hydrogen ($H^+$) in the proton conductive group of the proton conductive polymer may be substituted with $Na^+$, $K^+$, $Li^+$, $Cs^+$, or tetrabutylammonium$^+$. When the $H^+$ in the ionic exchange group of the proton conductive polymer is substituted with $Na^+$ or tetrabutylammonium, NaOH or tetrabutylammonium hydroxide may be used, respectively. When the $H^+$ is substituted with $K^+$, $Li^+$, or $Cs^+$, suitable compounds for the substitutions may be used. Since such a substitution is known to this art, a detailed description thereof is omitted. The polymer electrolyte membrane substituted with $Na^+$, $K^+$, $Li^+$, $Cs^+$, or tetrabutylammonium may return to a proton-form ($H^+$-form) polymer electrolyte membrane during acid treatment process of a catalyst layer.

According to another embodiment, a fuel cell system includes at least one electricity generating element, a fuel supplier and an oxidant supplier. The electricity generating element includes, for example, a membrane-electrode assembly according to the present disclosure, and a separator (also referred to a bipolar plate). The electricity generating element may be configured to generate electricity through oxidation of a fuel and reduction of an oxidant.

The fuel supplier may be fluidly connected to and/or may be configured to supply the electricity generating element with a fuel. The oxidant supplier may be fluidly connected to and/or may be configured to supply the electricity generating element with an oxidant such as oxygen or air. The fuel may include liquid or gaseous hydrogen, or a hydrocarbon-based fuel. The hydrocarbon fuel may include methanol, ethanol, propanol, butanol, or natural gas.

Figure 2:
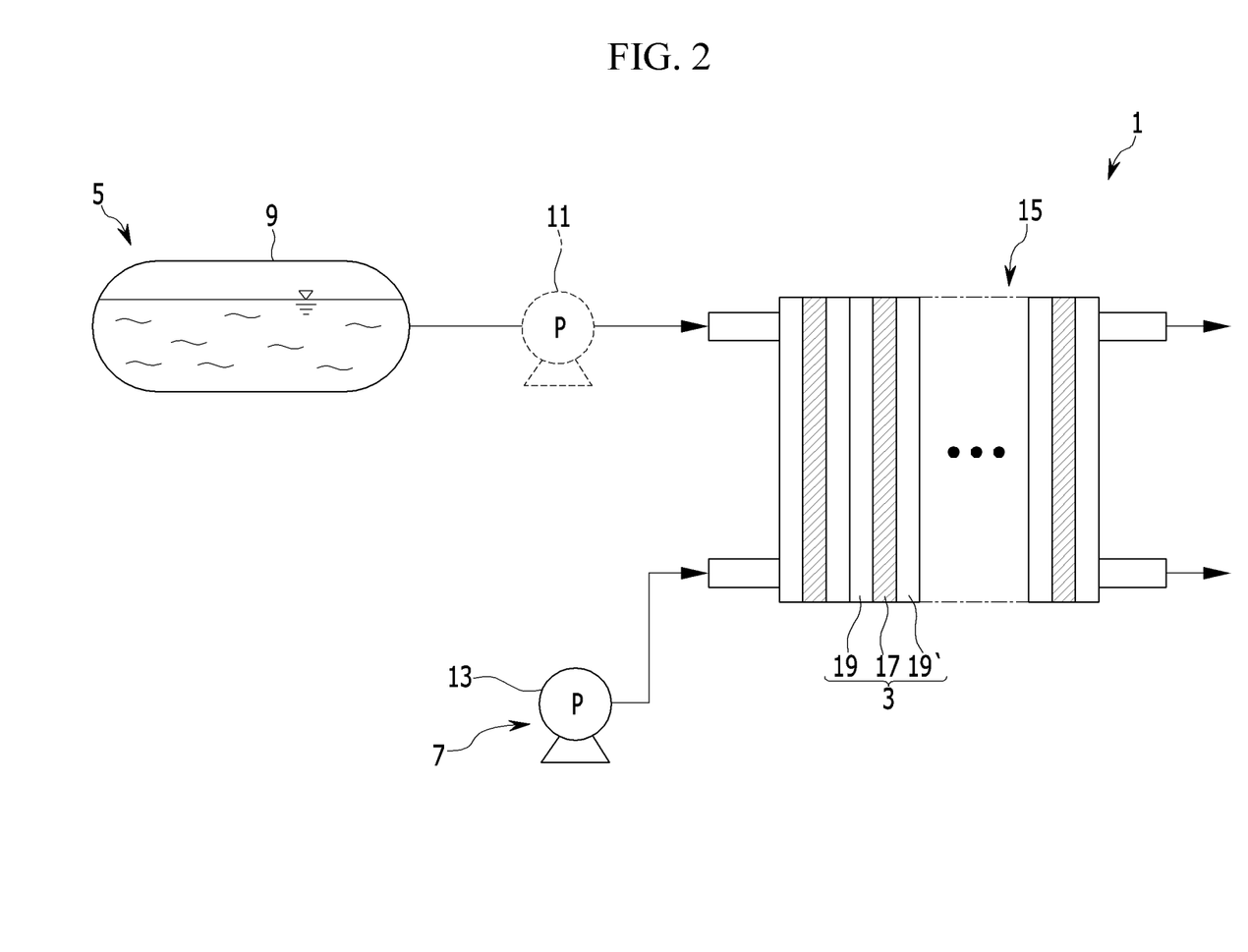
FIG. 2 is a schematic structure showing a fuel cell system according to one embodiment.

FIG. 2 shows a schematic structure of a fuel cell system according to one embodiment that will be described in detail with reference to this accompanying drawing as follows. FIG. 2 illustrates a fuel cell system wherein a fuel and an oxidant are provided to the electricity generating element through pumps, but the present disclosure is not limited to such structures. The fuel cell system may include a structure wherein a fuel and an oxidant are provided in a diffusion manner.

A fuel cell system 1 includes at least one electricity generating element 3 configured to generate electrical energy through an electrochemical reaction of a fuel and an oxidant, a fuel supplier 5 configured for supplying a fuel to the electricity generating element 3, and an oxidant supplier 7 configured for supplying an oxidant to the electricity generating element 3.

In addition, the fuel supplier 5 is equipped with a tank 9 that stores a fuel, and a fuel pump 11 that is connected therewith. The fuel pump 11 is configured to supply fuel stored in the tank 9 with a predetermined pumping power. The oxidant supplier 7, which may be configured to supply the electricity generating element 3 with an oxidant, is equipped with at least one pump 13 configured for supplying an oxidant with a predetermined pumping power. The electricity generating element 3 includes a membrane-electrode assembly 17 configured for oxidizing hydrogen or a fuel and reducing an oxidant, and separators 19 and 19' that are respectively positioned at opposite sides of the membrane-electrode assembly and supply hydrogen or a fuel and an oxidant. At least one electricity generating element 17 is composed of a stack 15.

The following examples illustrate the present disclosure in more detail. However, it is understood that the disclosure is not limited by these examples.

PREPARATION EXAMPLES 1 TO 7

$NH_2$ group are bonded to carbon nanotubes, and the carbon nanotubes having $NH_2$ group was added to distilled water, preparing a conductive liquid with a concentration of 0.05 wt %. Next, the conductive liquid was adjusted to have pH of 1.5, 2, 2.5, 3, 4, 5.5, and 6 using 0.1M HCl and 0.1M NaOH to prepare a first to seventh charged liquids.

PREPARATION EXAMPLES 8 TO 15

Graphene was added to distilled water, preparing a conductive liquid with a concentration of 0.2 wt %. The conductive liquid was adjusted to have pH of 1.5, 2.5, 3.5, 4, 5, 6, and 7 using 0.1M HCl and 0.1M NaOH to prepare a eighth to fifteenth charged liquids.

Figure 3:
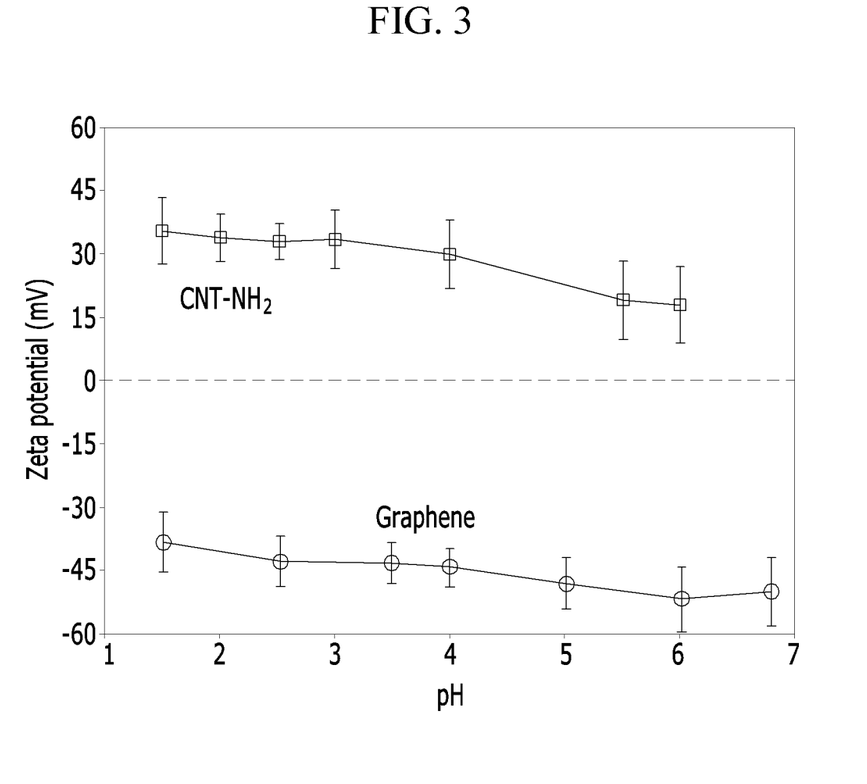
FIG. 3 is a graph showing zeta potential of the first to fifteenth charged liquids according to Preparation Examples 1 to 15.

The charged liquids according to Preparation Examples 1 to 15 were respectively measured regarding zeta potential. The results are provided in FIG. 3. As shown in FIG. 3, the carbon nanotube bonded with $NH_2$ was all positive charged, while the graphane was negatively charged.

PREPARATION EXAMPLE 16

A conductive liquid having a concentration of 0.25 wt % was prepared by adding carbon black to distilled water. The conductive liquid was adjusted to have pH of 6.5 using HCl having a concentration of 0.1 M and NaOH having a concentration of 0.1 M, preparing a sixteenth charged liquid. Herein, the sixteenth charged liquid was negatively charged.

PREPARATION EXAMPLE 17

Polyethyleneimine having a weight average molecular weight (Mw) of 25000 was added to distilled water, preparing a conductive liquid having a concentration of 0.05 wt %. The conductive liquid was adjusted to have pH of 6.5 using HCl having 0.1 M of a concentration and NaOH having a concentration of 0.1 M, preparing a seventeenth charged liquid. Herein, the seventeenth charged liquid was positively charged.

PREPARATION EXAMPLE 18

Carbon black was added to distilled water, preparing a conductive liquid having 0.25 wt % of a concentration. The conductive liquid was adjusted to have pH of 4.5 using HCl having 0.1 M of a concentration and NaOH having 0.1 M of a concentration, preparing an eighteenth charged liquid. Herein, the eighteenth charged liquid was positively charged.

PREPARATION EXAMPLE 19

Polyacrylic acid having a weight average molecular weight (Mw) of 10000 was added to distilled water, preparing a conductive liquid having 0.05 wt % of a concentration. The conductive liquid was adjusted to have pH of 4.5 using HCl with a concentration of 0.1 M and NaOH with a concentration of 0.1 M, preparing a nineteenth charged liquid. Herein, the nineteenth charged liquid was negatively charged.

PREPARATION EXAMPLE 20

The sixteenth charged liquid was coated on a carbon paper conductive substrate to form a negative charged layer, and the seventeenth charged liquid was coated on the negative charged layer to form a positive charged layer. The negative and positive charged layers were called to be a bilayer. These four bilayers were deposited to fabricate an electrode substrate.

PREPARATION EXAMPLE 21

An electrode substrate was fabricated according to the same method as Preparation Example 20 except for depositing 6 bilayers.

PREPARATION EXAMPLE 22

An electrode substrate was fabricated according to the same method as Preparation Example 20 except for depositing 8 bilayers.

PREPARATION EXAMPLE 23

An electrode substrate was fabricated according to the same method as Preparation Example 20 except for depositing 10 bilayers.

PREPARATION EXAMPLE 24

An electrode substrate was fabricated according to the same method as Preparation Example 20 except for depositing 12 bilayers.

PREPARATION EXAMPLE 25

An electrode substrate was fabricated according to the same method as Preparation Example 20 except for depositing 14 bilayers.

PREPARATION EXAMPLE 26

The sixteenth charged liquid was coated on a carbon paper conductive substrate to form a negative charged layer, and the seventeenth charged liquid was coated on the negative charged layer to form a positive charged layer. The negative and positive charged layers were called to be a bilayer. The four bilayers were deposited. Next, the conductive substrate having the 4 bilayers was heat-treated at 550° C. for 2 hours, fabricating an electrode substrate.

PREPARATION EXAMPLE 27

An electrode substrate was fabricated according to the same method as Preparation Example 26 except for depositing 6 bilayers.

PREPARATION EXAMPLE 28

An electrode substrate was fabricated according to the same method as Preparation Example 26 except for depositing 8 bilayers.

PREPARATION EXAMPLE 29

An electrode substrate was fabricated according to the same method as Preparation Example 26 except for depositing 10 bilayers.

PREPARATION EXAMPLE 30

An electrode substrate was fabricated according to the same method as Preparation Example 26 except for depositing 12 bilayers.

PREPARATION EXAMPLE 31

An electrode substrate was fabricated according to the same method as Preparation Example 26 except for depositing 14 bilayers.

Figure 4:
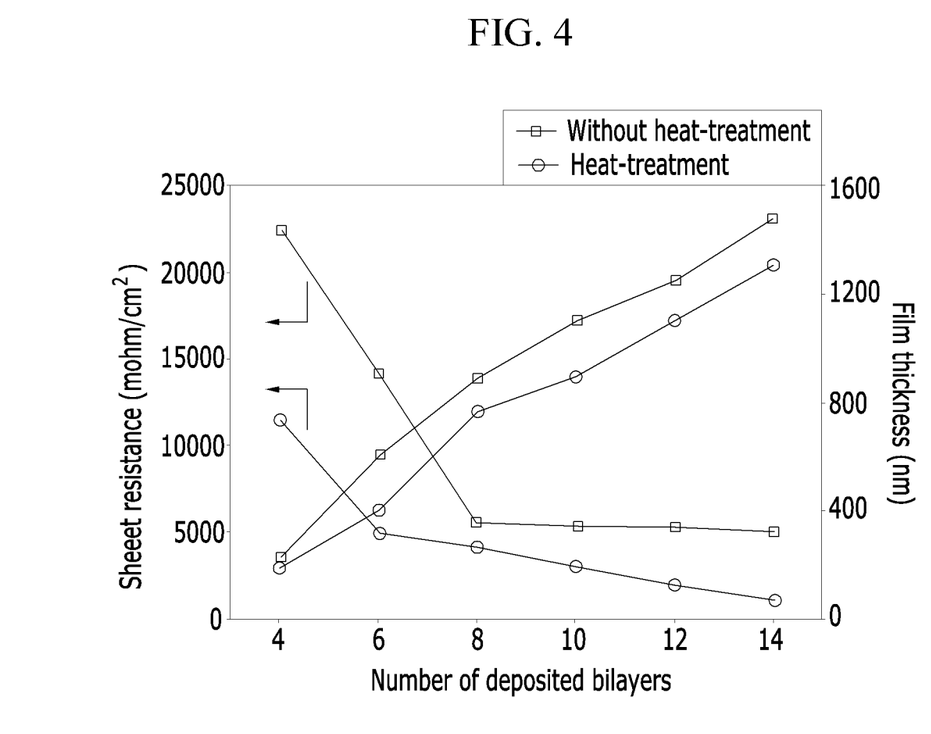
FIG. 4 is a graph showing sheet resistance and film thickness of the electrode substrates according to Preparation Examples 20 to 31.

The electrode substrates according to Preparation Examples 20 to 31 were measured regarding thickness of the bilayers except for thickness of the conductive substrate. The results are provided in FIG. 4. In addition, the electrode substrates were respectively measured regarding sheet resistance. The results are also provided in FIG. 4. As shown in FIG. 4, the number of the deposited bilayers and the thickness increased linearly. The electrodes having heat-treatment were a little thinner than ones having no heat-treatment. It is considered that the reason is that carbon particles were bonded together and agglomerated or an organic polymer was removed. In addition, as shown in FIG. 4, as the number of the bilayers increases, the film resistance decreased. The electrodes having no heat treatment according to Preparation Examples 22 to 25 had no film resistance decrease though the number of bilayers increase to 8 or more, while the heat-treated electrodes according to Preparation Examples 26 to 31 had film resistance decrease as the number of bilayers increased. Based on the result, when greater than or equal to 8 bilayers are deposited, the electrode may be more appropriately used as a conductive substrate for a fuel cell.

EXAMPLE 1

88 wt % of a PtRu/C anode catalyst and 12 wt % of Nafion/$H_2O$/2-propanol (Solution Technology Inc.) with 5 wt % of a concentration as a binder were used to prepare a catalyst for a composition. The catalyst composition for an anode was coated on the electrode substrate according to Preparation Example 29 to fabricate an anode. Herein, the anode included a catalyst in a loading amount of about 0.30 mg/cm².

On the other hand, 88 wt % of a PtCo/C cathode catalyst and 12 wt % of Nafion/H₂O/2-propanol (Solution Technology Inc.) with a concentration of 5 wt % as a binder were used to prepare a catalyst composition for a cathode. The catalyst composition for a cathode was coated on an electrode substrate fabricated according to Preparation Example 29, fabricating a cathode. Herein, the cathode included a catalyst loaded in an amount of about 0.26 mg/cm².

The anode and cathode and a poly(ethersulfone)-based polymer electrolyte film were used to fabricate a unit battery cell having a reaction area of 25 cm².

COMPARATIVE EXAMPLE 1

A unit cell was fabricated according to the same method as Example 1 except for using a carbon paper electrode substrate including carbon of 0.2 mg/cm² to fabricate an anode and a cathode.

The unit cells according to Example 1 and Comparative Example 1 were measured regarding current density and output density at an operation voltage of 0.7 V, while flowing hydrogen gas as a fuel and oxygen gas as an oxidant into the cells when the temperature maintained at 60° C., at stoichiometry (the amount of hydrogen gas supplied in an anode/the amount of oxygen gas supplied in a cathode, theoretical value for an electrochemical reaction, λ)=1.2/2.5. In addition, the anode had relative humidity of 80%, and the cathode had relative humidity of 80%.

Figure 5:
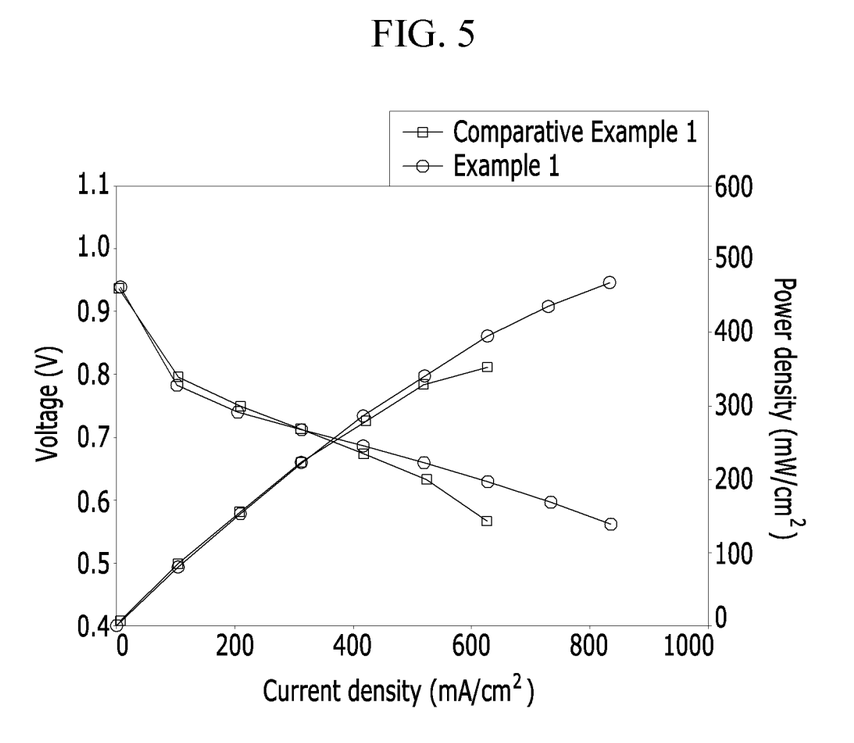
FIG. 5 is a graph showing current density and output density of the fuel cells according to Example 1 and Comparative Example 1.

FIG. 5 shows the current density and output density results. As shown in FIG. 5, the fuel cell according to Example 1 had excellent current density and output density compared with the one according to Comparative Example 1.

While this disclosure has been described in connection with what is presently considered to be practical exemplary embodiments, it will be appreciated by those skilled in the art that various modifications and changes may be made without departing from the scope of the present disclosure. It will also be appreciated by those of skill in the art that parts mixed with one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments. With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity. Thus, while the present disclosure has described certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An electrode for a fuel cell, comprising:
   an electrode substrate including a conductive substrate and a layer-by-layer assembled multi-layer disposed on a side of the conductive substrate, wherein the layer-by-layer assembled multi-layer includes a plurality of bilayers, each of the plurality of bilayers including a polymer electrolyte or a conductive nanoparticle, wherein at least one of the plurality of bilayers includes a first and a second charged layer, and wherein the second charged layer has an opposite charge to the first charged layer; and
   a catalyst layer disposed on the second charged layer,
   wherein the at least one of the plurality of bilayers is positioned between the conductive substrate and the catalyst layer.

2. The electrode of claim 1, wherein the polymer electrolyte comprises a material selected from the group consisting of polyethyleneimine, polyacrylic acid, poly(diallyldimethylammonium) chloride, chitosan, poly(allylamine hydrochloride), poly(sodium styrenesulfonate), carboxylmethyl cellulose, poly(ethylene glycol), and a combination thereof.

3. The electrode of claim 1, wherein the polymer electrolyte has a weight average molecular weight of about 7,000 Daltons to about 1,000,000 Daltons.

4. The electrode of claim 1, wherein the conductive nanoparticle is selected from the group consisting of carbon black, graphene, carbon nanotube, a carbon nanofiber, $SiO_2$, $TiO_2$, $ZrO_2$, $CeO_2$, and a combination thereof, and wherein the conductive nanoparticle has an amine group (—$NH_2$), a sulfonic acid group (—$SO_3H$), or a nitrile group (—CN) on its surface.

5. The electrode of claim 1, wherein the conductive nanoparticle has a carboxyl group (—COOH), an amine group (—$NH_2$), or a hydroxyl group (—OH) on its surface.

6. The electrode of claim 1, wherein the conductive nanoparticle has an amine group (—$NH_2$) on its surface.

7. The electrode of claim 1, wherein the layer-by-layer assembled multi-layer has a thickness of about 50 nm to about 2 μm.

8. The electrode of claim 1, wherein the plurality of bilayers has up to about 40 bilayers.

9. The electrode of claim 1, wherein the plurality of bilayers has about 8 to about 40 bilayers.

10. The electrode of claim 1, wherein the conductive substrate includes a carbon paper, a carbon cloth, a carbon felt, or a metal cloth.

11. A membrane-electrode assembly for a fuel cell, comprising:
    an anode and a cathode facing each other; and
    a polymer electrolyte membrane interposed between the cathode and the anode,
    wherein at least one of the cathode and the anode is an electrode of claim 1.

12. A fuel cell system, comprising:
    at least one electricity generating element comprising the membrane-electrode assembly of claim 11 and a separator disposed at each side of the membrane-electrode assembly, the electricity generating element configured to generate electricity through oxidation of a fuel and reduction of an oxidant;
    a fuel supplier in fluid communication with and configured for supplying a fuel to the electricity generating element; and
    an oxidant supplier in fluid communication with and configured for supplying the oxidant to the electricity generating element.

* * * * *